US010456609B2

United States Patent
Yang et al.

(10) Patent No.: US 10,456,609 B2
(45) Date of Patent: *Oct. 29, 2019

(54) BUFFERING BACKPACK DEVICE FOR FALLING PROTECTION

(71) Applicant: AEROHOOK TECHNOLOGY CO., LTD., Taichung (TW)

(72) Inventors: Kai Chieh Yang, Taichung (TW); Chia Cheng J Huang, Taichung (TW)

(73) Assignee: AKILA TECH CO., LTD., Taoyuan (TW)

( * ) Notice: Subject to any disclaimer, the term of this patent is extended or adjusted under 35 U.S.C. 154(b) by 110 days.

This patent is subject to a terminal disclaimer.

(21) Appl. No.: 15/607,487

(22) Filed: May 27, 2017

(65) Prior Publication Data

US 2018/0339179 A1 Nov. 29, 2018

(51) Int. Cl.
*A62B 35/00* (2006.01)
*A62B 35/04* (2006.01)
*F16F 7/00* (2006.01)
F16B 45/04 (2006.01)

(52) U.S. Cl.
CPC .......... *A62B 35/04* (2013.01); *A62B 35/0075* (2013.01); *F16F 7/006* (2013.01); *F16B 45/04* (2013.01); *F16F 7/003* (2013.01)

(58) Field of Classification Search
CPC ..... A62B 35/04; A62B 35/00; A62B 35/0006; A62B 35/0025; A62B 35/0031; A62B 35/0037; A62B 35/0075; A41D 13/0007; F16F 17/006; F16F 7/003; F16F 7/006; F16B 45/04

See application file for complete search history.

(56) References Cited

U.S. PATENT DOCUMENTS 3,444,957 A * 5/1969 Ervin, Jr. ............... A62B 35/04
  182/3
5,090,503 A * 2/1992 Bell ....................... A62B 35/04
  182/5

(Continued)

*Primary Examiner* — Daniel P Cahn
(74) *Attorney, Agent, or Firm* — Raymond Y. Chan; David and Raymond Patent Firm

(57) ABSTRACT

The present invention utilizes a backpack body to define an openable accommodation chamber. The accommodation chamber further has an opening on the top end thereof for the communication of the inside and outside thereof. The accommodation chamber utilizes a restricting structure to position an energy absorption band. The energy absorption band is formed of at least a first layer and a second layer that are coincidingly bound. The top ends of the first layer and the second layer extend a first connecting portion and a second connecting portion respectively. The first connecting portion and the second connecting portion divergently protrude from the backpack body via the opening. The first connecting portion is for coupling with a safety harness, while the second connecting portion is for coupling with an anti-falling device. When the user falls, the falling will make the restricting structure release the first layer and the second layer, so that the first layer and the second layer can leave the accommodation chamber via the opening for anti-falling suspension. Accordingly, the present invention just has real improvements, including fine appearance, economic efficiency, and etc.

6 Claims, 8 Drawing Sheets

(56) References Cited

U.S. PATENT DOCUMENTS

| | | | | |
|---|---|---|---|---|
| 5,287,943 | A * | 2/1994 | Bell | A62B 35/04 182/3 |
| 5,960,480 | A * | 10/1999 | Neustater | A62B 35/04 182/3 |
| 6,533,066 | B1 * | 3/2003 | O'Dell | A62B 35/04 182/3 |
| 6,851,516 | B2 * | 2/2005 | Petzl | A62B 35/04 182/3 |
| 8,584,799 | B1 * | 11/2013 | Dennington | A62B 35/04 182/3 |
| 9,174,073 | B2 * | 11/2015 | Casebolt | A62B 35/0025 |
| 2004/0163156 | A1 * | 8/2004 | Schweer | A41D 13/0007 2/69 |
| 2005/0067221 | A1 * | 3/2005 | Wolner | A62B 35/0031 182/3 |
| 2006/0113147 | A1 * | 6/2006 | Harris, Jr. | A62B 35/0093 182/3 |
| 2006/0169534 | A1 * | 8/2006 | Green | A01M 31/02 182/7 |
| 2008/0156839 | A1 * | 7/2008 | Betcher | A45F 3/14 224/630 |
| 2008/0256678 | A1 * | 10/2008 | Grilliot | A62B 35/0037 2/69 |
| 2009/0235425 | A1 * | 9/2009 | Walker | A62B 1/16 2/69 |
| 2010/0163338 | A1 * | 7/2010 | Wood | A62B 1/14 182/6 |
| 2012/0222912 | A1 * | 9/2012 | Wood | A62B 1/14 182/6 |
| 2013/0037347 | A1 * | 2/2013 | Wood | A62B 1/14 182/6 |
| 2013/0292219 | A1 * | 11/2013 | Perner | A62B 35/04 188/376 |
| 2014/0224580 | A1 * | 8/2014 | Casebolt | A62B 35/0025 182/3 |
| 2014/0339017 | A1 * | 11/2014 | Wood | A62B 1/14 182/5 |
| 2015/0217149 | A1 * | 8/2015 | Stewart | A62B 35/0075 182/5 |
| 2015/0217150 | A1 * | 8/2015 | Harris | A62B 35/0093 182/5 |
| 2015/0359272 | A1 * | 12/2015 | Murphy | A62B 35/0025 2/69 |
| 2016/0287917 | A1 * | 10/2016 | Remler | A62B 35/0018 |
| 2017/0001049 | A1 * | 1/2017 | Zeppetella | A62B 35/0006 |
| 2017/0281989 | A1 * | 10/2017 | Wood | A62B 1/14 |
| 2018/0200548 | A1 * | 7/2018 | Wood | A62B 35/0025 |
| 2019/0192888 | A1 * | 6/2019 | Christianson | A62B 35/0025 |

* cited by examiner

BUFFERING BACKPACK DEVICE FOR FALLING PROTECTION

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention particularly relates to the technical field of backpack body controlling the clutching of an energy absorption band.

Description of Related Arts

There are prior art patents, including Taiwan Pat. No. 105212408—"Parallel Falling Protection Buffer Device," Taiwan Pat. No. 105204339—"Compensated Falling Protection Buffer Device," and etc. However, because the thickness of the folded energy absorption band cannot be reduced, when the device is carried on the back of the user, it not only looks odd, but also causes interference and improper bumping sometimes when the user is working at heights in a limited space, which somehow renders the user's falling or remains the risk of losing the balance.

Therefore, there is a U.S. patent application, application Ser. No. 13/826,876 "Energy Absorber Assembly and Components Thereof" invented for dealing with the above drawbacks. It discloses a connector configured to operatively connect to a safety harness, a restricting structure arranged on the connector, a bracket coupled with the restricting structure, and an upside down V-shaped energy absorption band arranged between the connector and the bracket, so that the restricting structure can upwardly assemble the bracket and the energy absorption band on the connector on the back of the safety harness. Therefore, when the user is moving, the thickness reduced energy absorption band will less likely to interfere his/her movement. Besides, when the user accidentally falls, the restricting structure will break first and release the bracket. Then the tearing of the energy absorption band will absorb the falling impact and safely hang the user in the air.

Unfortunately, because this prior art utilizes a restricting structure to couple the bracket with the connector, it has to firstly drill holes on the bracket and connector, so as to arrange the restricting structure with these holes. Such structural arrangement further has drawbacks including high processing cost, long assembling time, poor appearance, and etc.

Accordingly, the inventor of the present invention has elaborately conducted his research and development and eventually comes up with the present invention that is able to improve on the drawbacks of the prior arts.

SUMMARY OF THE PRESENT INVENTION

The present invention provides a buffering backpack device for falling protection, comprising:

a backpack body, having and defining an accommodation chamber, wherein the accommodation chamber has an opening on a top thereof for the communication of the inside and outside thereof;

an energy absorption band arranged in the accommodation chamber and formed by a first layer and a second layer coincidingly bound with each other, wherein a top end of the first layer has a first connecting portion extended therefrom, wherein a top end of the second layer has a second connecting portion extended therefrom, wherein the first connecting portion and the second connecting portion divergently protrude from the backpack body via the opening, wherein the first connecting portion is for coupling with a safety harness, wherein the second connecting portion is for coupling with an anti-falling device; and a restricting structure, controlling and positioning the first layer and the second layer of the energy absorption band in the accommodation chamber, wherein when the user falls, the restricting structure will release the first layer and the second layer, such that the first layer and the second layer will leave the accommodation chamber via the opening for anti-falling buffering.

Accordingly, the present invention utilizes the restricting structure to accommodate the energy absorption band in the backpack body, so as to achieve a better overall appearance. It has actual improvement and provides a more economically efficient overall arrangement than the prior art, U.S. patent application Ser. No. 13/826,876.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1-8, the present invention comprises a backpack body 10, an energy absorption band 20 and a restricting structure.

Figure 1:
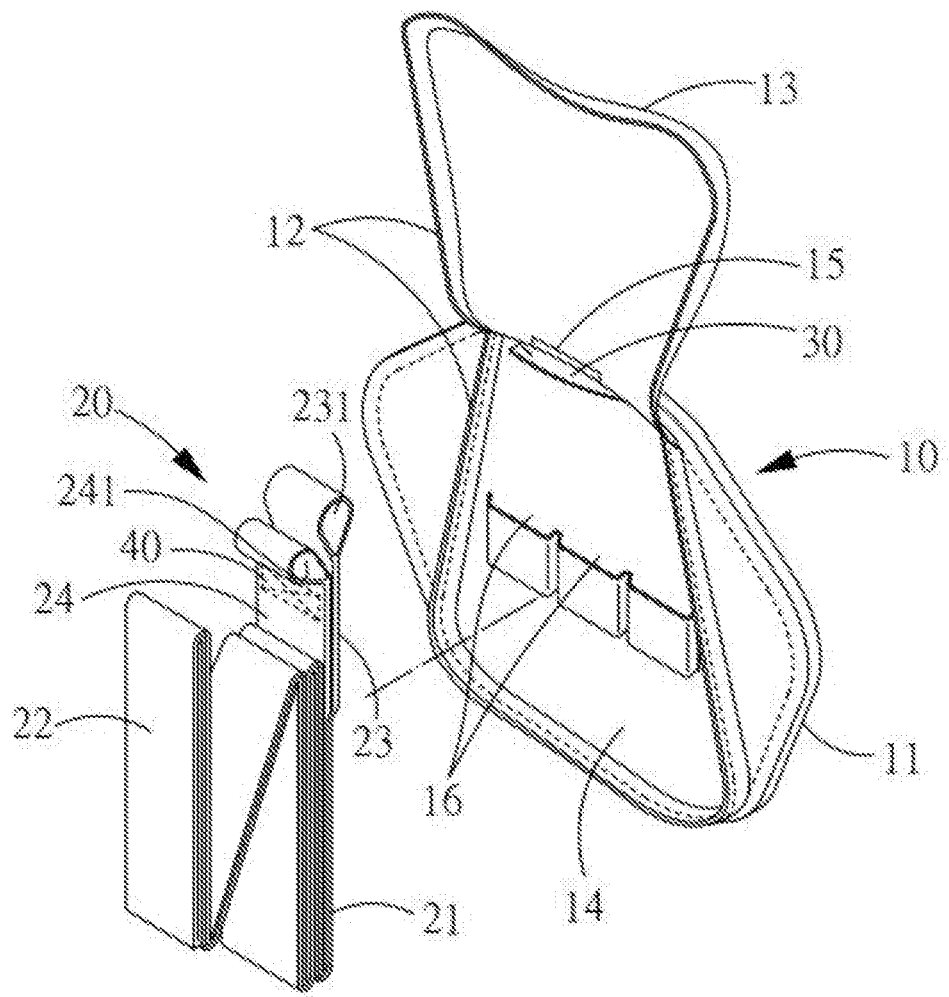
FIG. 1 is an exploded perspective view of the buffering backpack device according to a preferred embodiment of the present invention.
Figure 2:
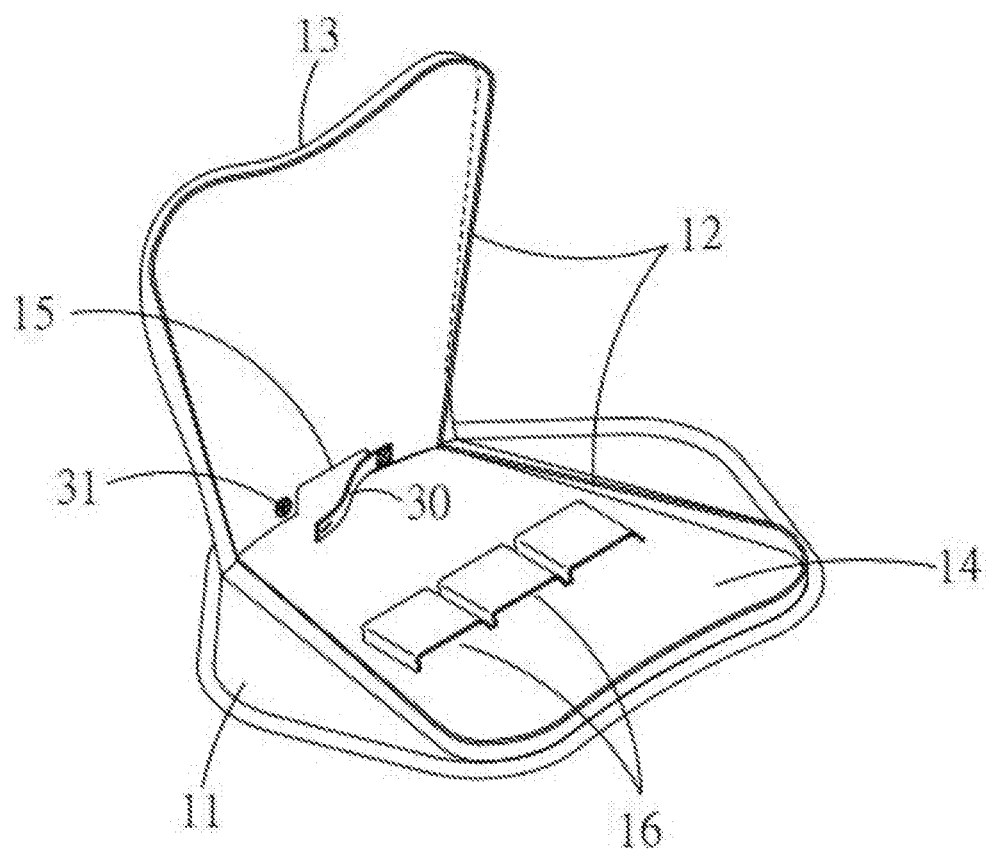
FIG. 2 is a perspective view of a backpack body, viewing from another direction, according to the above preferred embodiment of the present invention.
Figure 3:
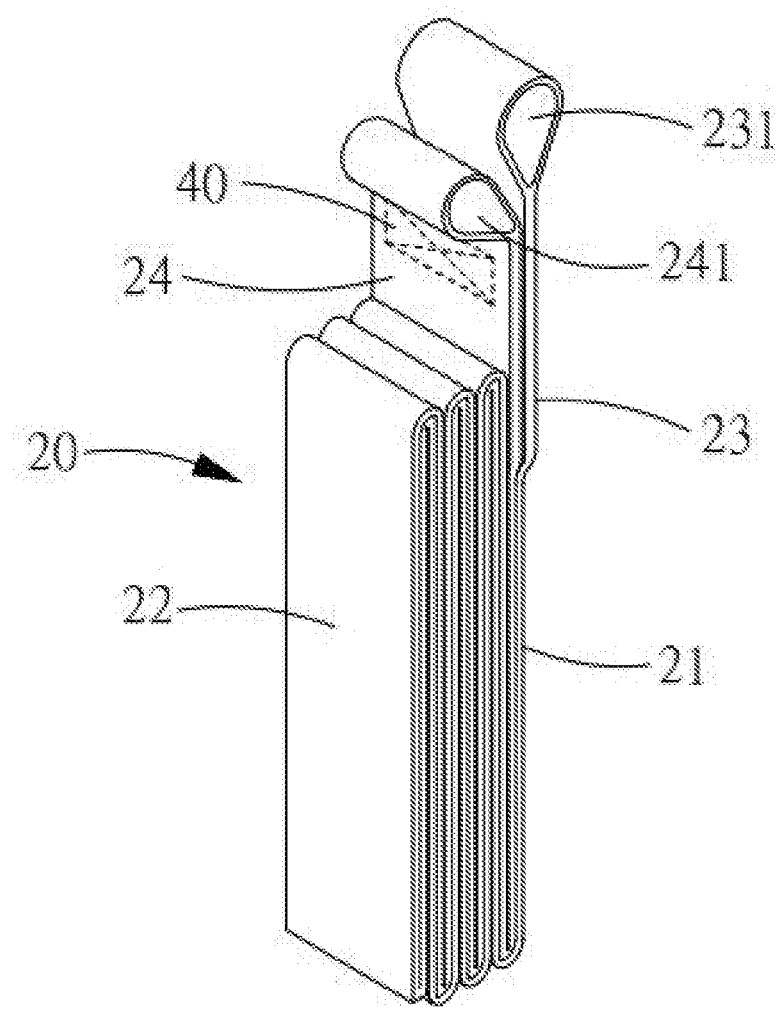
FIG. 3 is a perspective view illustrating the original state of the energy absorption band according to the preferred embodiment of the present invention.
Figure 4:
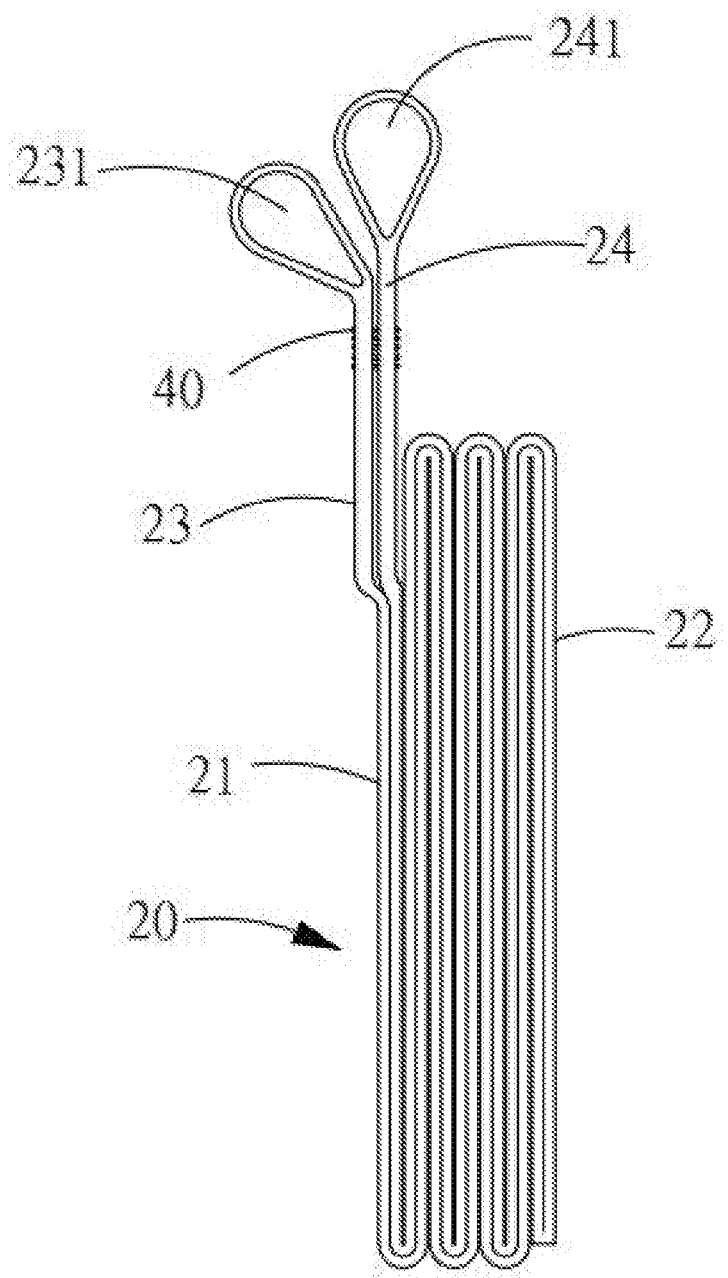
FIG. 4 is a side perspective view of FIG. 3.
Figure 5:
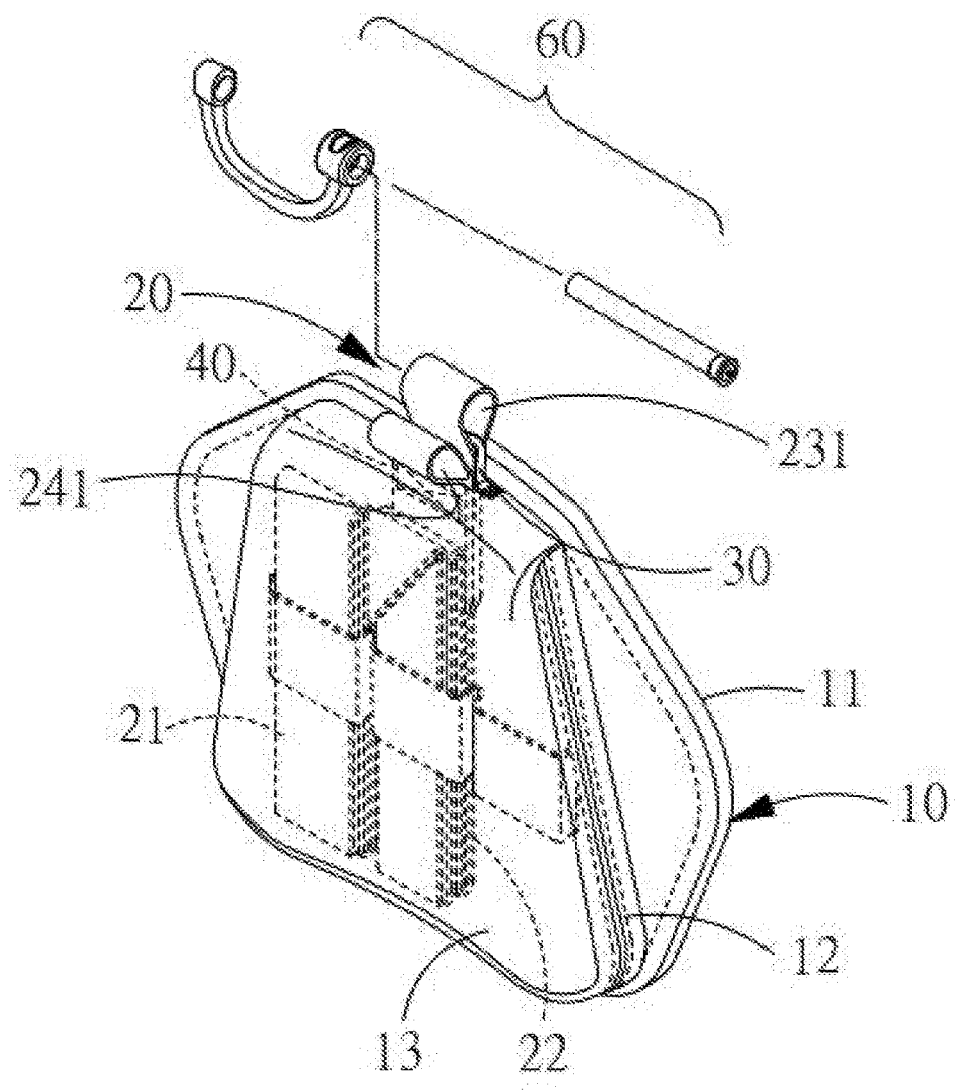
FIG. 5 is a perspective view illustrating an assembly appearance of the buffering backpack device according to the above preferred embodiment of present invention.
Figure 6:
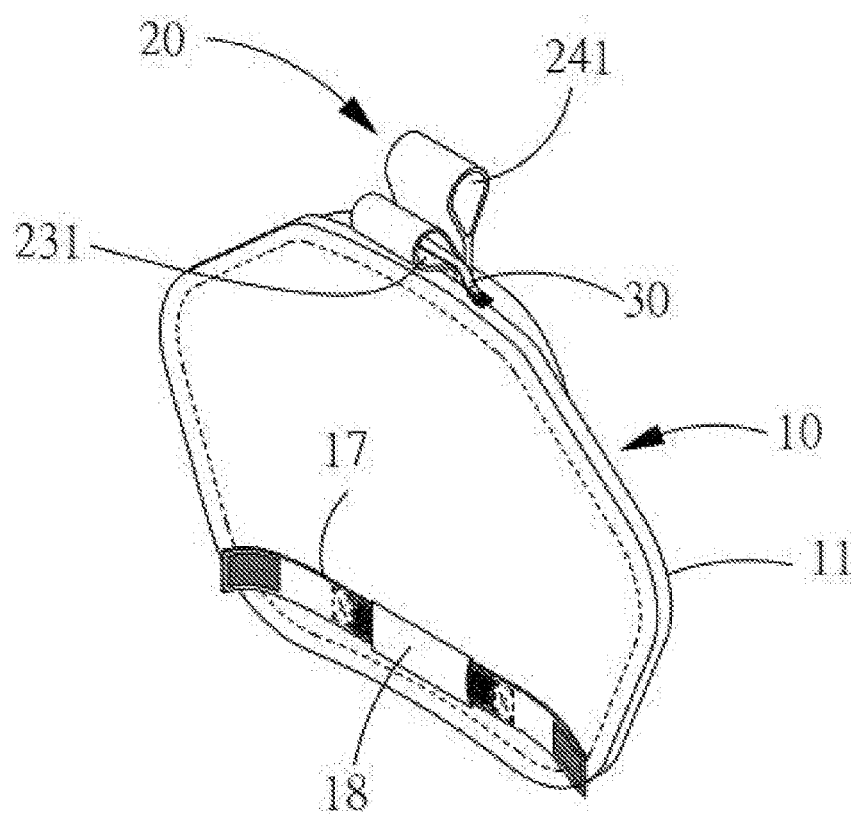
FIG. 6 is a rear perspective view of FIG. 5.
Figure 7:
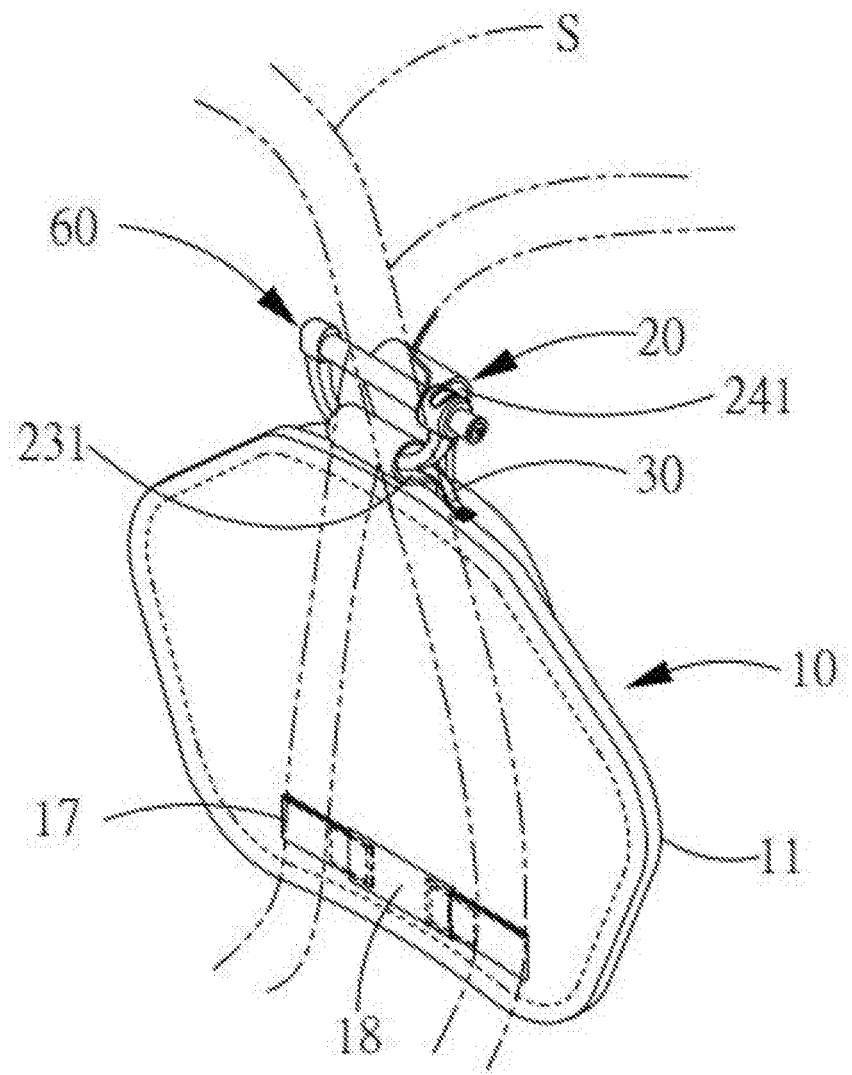
FIG. 7 is a perspective view illustrating the backpack body arranged on the safety harness according to the above preferred embodiment of the present invention.

The backpack body 10, referring to FIGS. 1 and 2, comprises a back board 11 and a zipper 12 arranged in front of the back board 11 in a U-shape manner for coupling with a front cover 13, so as to define an openable accommodation chamber 14 between the back board 11 and the front cover 13. The left and right edges of a top end of the front cover 13 are sewn on the back board 11, so as to form an opening 15 at a center portion thereof to connect and communicate with a top end of the accommodation chamber 14. Besides, the accommodation chamber 14 also has a plurality of insertion portions 16 connected to the opening 15. Referring to FIGS. 6 and 7, the back board comprises a fastener 17 horizontally arranged on the back side thereof, wherein a middle portion of the fastener 17 is sewed and attached on the back board for the left and right portion of the fastener 17 to circle around a coordinate safety harness S. Then, the left and right portions of the fastener 17 can be fastened toward and on the middle portion of the fastener 17, so as to attach the back of the back board 11 on the safety harness S on the user's back and to avoid the risk of the fastener 17 from being lifted. The fastener 17 further comprises an elastic element 18 covering on the middle portion thereof. Therefore, the user only has to pull the elastic element 18 to put on/off the fastener 17 and the safety harness S.

The energy absorption band 20, referring to FIGS. 1, 3, 4, and 5, is formed of at least a first layer 21 and a second layer 22 thereof. Specifically, the energy absorber is a ribbon shaped fabric being upwardly folded up to form the first layer 21 on one side and the second layer 22 on the other side and arranges the first layer 21 and the second layer 22 to coincidingly bound together through sewing with stitch thread. The energy absorption band 20 is arranged in the accommodation chamber 14 and sharingly inserted in the insertion portions 16 to effectively reduce the overall thickness of the energy absorption band 20 so as to improve the conventional odd and poor appearance. The top end of the above first layer 21 also extends to form a first connecting portion 23 protruding from the backpack body 10 via the opening 15. The top end of the second layer 22 extends to form a second connecting portion 24 protruding from the backpack body 10 via the opening 15 so as for coupling with an anti-falling device 50. It has to be especially noted that the first connecting portion 23 and the second connecting portion 24 are divergedly arranged. When dealing with the falling of the user, the first connecting portion 23 and the second connecting portion 24 can followingly pull out the first layer 21 and the second layer 22 from the insertion portion 16 through the opening 15, such that the first layer 21 and the second layer 22 can be sequentially torn from top to bottom for suspending and buffering the falling. The top margin of the first connecting portion 23 has a first lughole 231 formed thereon to allow the connecting device 60 to attach the first connecting portion 23 on the safety harness S on the user's back. The top margin of the second connecting portion 24 has a second lughole 241 formed thereon for coupling with the anti-falling device 50.

The restricting structure is formed of a first arrangement 30 and a second arrangement 40 thereof. The first arrangement 30 attaches and affixes the first connecting portion 23 and the backpack body 10. The first arrangement 30 can be a tie, wherein, referring to FIGS. 2, 6 and 8, an end thereof is affixed on a side of the opening 15 of the backpack body 10, while the other end thereof passes the first lughole 231 of the first connecting portion 23 to be buckled on a buckle 31 arranged at the other side of the opening 15 of the backpack body 10. The second arrangement 40 attaches and affixes the first connecting portion 23 and the second connecting portion 24. Therefore, it can, only by means of the first arrangement 30 and the second arrangement 40, avoid the issue that the anti-falling device 50 pulls out the first layer 21 and the second layer 22 via the opening 15 due to its own weight when the user is walking or working with the anti-falling device 50 carrying on his/her back. On the other hand, when the user falls, the second arrangement 40 will break first, so as to release the first connecting portion 23 and the second connecting portion 24, such that the coincidingly bound portion of the first layer 21 and the second layer 22 of the energy absorption band 20 can leave the accommodation chamber 14 via the opening 15 to absorb the falling impact by sequential tearing. In other words, the first arrangement 30 and the second arrangement 40 can also provide linkage through regular buckle or sewing attachment. As long as it can control the releasing of the first layer 21 and the second layer 22 of the energy absorption band 20 via the opening 15 to occur when the user falls, so as to sequentially tear them from top to bottom to provide suspension effect. Similarly, the first arrangement 30 and the second arrangement 40 can also be integrated, so as to directly utilize an arrangement of a tie, sewing, buckle, etc. to position the portion of the first layer 21 and the second layer 22 that is coincidingly bound on the back board 11 on the back board 11. Therefore, any means that restricts the first layer 21 and the second layer 22 in the accommodation chamber 14 and releases them only when the user falls shall be within the scope of the present invention.

Figure 8:
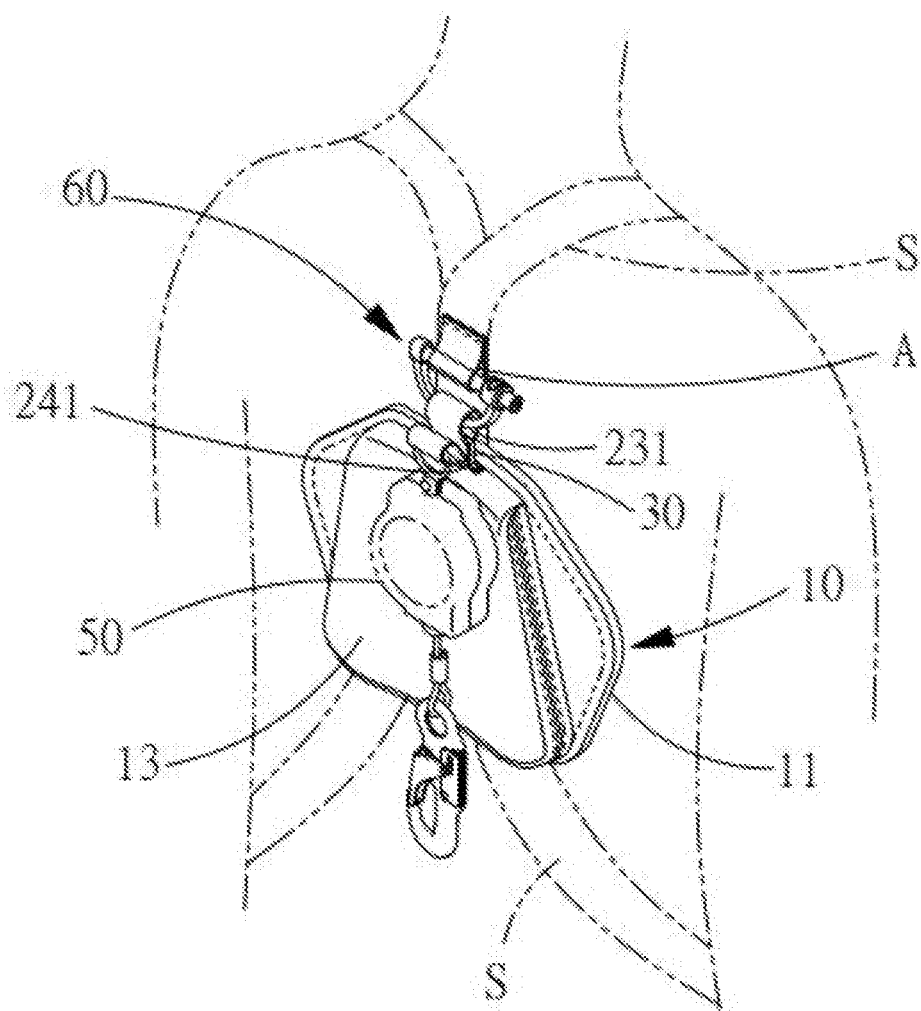
FIG. 8 is a perspective view of an implementation of the buffering backpack device according to the preferred embodiment of the present invention.

Referring to FIGS. 1 and 8, when the user utilizes the present invention in a regular operation, the first arrangement 30 and the second arrangement 40 can upwardly assemble the anti-falling device 50 and the energy absorption band 20 on the safety harness S on the back of the user and prevent the energy absorption band 20 and the backpack body 10 from detaching from each other. However, if the user falls, the second arrangement 40 will break due to gravity acceleration of the user, so as to release the first connecting portion 23 and the second connecting portion 24 of the energy absorption band 20. Then the energy absorption band 20 will be drawn and pulled out from the opening 15 and unfolded on the backpack body 10, so as to sequentially from top to bottom tear the first layer 21 and the second layer 22 from the top end of the energy absorption band 20 and along the energy absorption band 20, such that the impact of the falling user can be absorbed and the user can be suspendingly and safely hung in the air.

According to the above structure and descriptions of the embodiment, the present invention comprises the following advantages:

First, the present invention utilizes the first arrangement 30 and the second arrangement 40 of the restricting structure to accommodate the energy absorption band 20 in the backpack body 10, so as to provide a better appearance. Besides, the insertion portions 16 of the backpack body 10 can certainly greatly reduce the folding thickness of the energy absorption band 20, so that interference and improper bumping are less likely to occur when the user is working in a limited space, that decreases the risk of the user's falling or imbalance.

Second, the overall structure of the present invention can be easily finished by just arranging the second arrangement 40 on the top edge of the energy absorption band 20 before arranging into the backpack body 10 and coordinating with the arranging of the first arrangement 30, which is indeed more economically efficient than the prior art of U.S. application Ser. No. 13/826,876.

In short, the present invention makes a complete breakthrough on the overall structural features of the prior art of U.S. application Ser. No. 13/826,876 and provides a new structure that is different from prior art, which is nonobvious and is qualify for patent application. However, the above descriptions are only a preferred embodiment of the present invention, but not intend to be used to confine the scope of embodying the present invention, which means all equivalent varieties and modifications based on the appended claims of the present invention are within the scope of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A buffering backpack device, comprising:
a backpack body, having an accommodation chamber defined therein, wherein said accommodation chamber has an opening on top thereof for an inside of said accommodation chamber to communicate outside of said accommodation chamber;
an energy absorption band arranged in said accommodation chamber and formed by a first layer and a second layer coincidingly bound with each other, wherein a top end of said first layer has a first connecting portion extended therefrom, wherein a top end of said second layer has a second connecting portion extended therefrom, wherein said first connecting portion and said second connecting portion divergently protrude from said backpack body via said opening, wherein said first connecting portion is for coupling with a safety harness, wherein said second connecting portion is for coupling with an anti-falling device; and
a restricting structure, controlling and positioning said first layer and said second layer of said energy absorption band in said accommodation chamber, wherein when a user of said buffering backpack device falls, said restricting structure releases said first layer and said second layer, such that said first layer and said second layer leaves said accommodation chamber via said opening for anti-falling suspension, wherein said backpack body further comprises a back board and a zipper arranged in a U-shape manner on a front of said back board for coupling with a front cover, so as to define said accommodation chamber between said back board and said front cover, wherein a left edge and a right edge of a top end of said front cover are sewn on said back board to form said opening at a center portion thereof to connect and communicate with said accommodation chamber.

2. The buffering backpack device, as recited in claim 1, wherein said back board comprises a fastener horizontally arranged on a back side thereof, wherein a middle portion of said fastener is attached on said back board for left and right portions of said fastener to be fastened on said middle portion thereof.

3. The buffering backpack device, as recited in claim 2, wherein said fastener further comprises an elastic element covering on said middle portion of said fastener.

4. A buffering backpack device, comprising:
a backpack body, having an accommodation chamber defined therein, wherein said accommodation chamber has an opening on top thereof for an inside of said accommodation chamber to communicate outside of said accommodation chamber;
an energy absorption band arranged in said accommodation chamber and formed by a first layer and a second layer coincidingly bound with each other, wherein a top end of said first layer has a first connecting portion extended therefrom, wherein a top end of said second layer has a second connecting portion extended therefrom, wherein said first connecting portion and said second connecting portion divergently protrude from said backpack body via said opening, wherein said first connecting portion is for coupling with a safety harness, wherein said second connecting portion is for coupling with an anti-falling device; and
a restricting structure, controlling and positioning said first layer and said second layer of said energy absorption band in said accommodation chamber, wherein when a user of said buffering backpack device falls, said restricting structure releases said first layer and said second layer, such that said first layer and said second layer leaves said accommodation chamber via said opening for anti-falling suspension, wherein said restricting structure directly positions and arranges said first layer and said second layer in said backpack body, wherein when the user falls, said restricting structure releases said first layer and said second layer such that said first layer and said second layer are allowed to leave said accommodation chamber via said opening, wherein said backpack body further comprises a back board and a zipper arranged in a U-shape manner on a front of said back board for coupling with a front cover, so as to define said accommodation chamber between said back board and said front cover, wherein a left edge and a right edge of a top end of said front cover are sewn on said back board to form said opening at a center portion thereof to connect and communicate with said accommodation chamber.

5. The buffering backpack device, as recited in claim 4, wherein said back board comprises a fastener horizontally arranged on a back side thereof, wherein a middle portion of said fastener is attached on said back board for left and right portions of said fastener to be fastened on said middle portion thereof.

6. The buffering backpack device, as recited in claim 5, wherein said fastener further comprises an elastic element covering on said middle portion of said fastener.

* * * * *